United States Patent [19]

Thompson et al.

[11] 3,760,104

[45] Sept. 18, 1973

[54] POST PAY TELEPHONE PAYSTATION CIRCUIT

[75] Inventors: Joseph Thompson; Raymond Charles Hemming; John Edward Critchley; Ronald Joseph Morrell, all of London, Ontario, Canada

[73] Assignee: Northern Electric Company Limited, Montreal, Quebec, Canada

[22] Filed: Aug. 7, 1972

[21] Appl. No.: 278,542

Related U.S. Application Data

[63] Continuation-in-part of Ser. No. 170,454, Aug. 10, 1971, abandoned.

[52] U.S. Cl. .............................................. 179/6.3 R
[51] Int. Cl. .......................................... H04m 17/02
[58] Field of Search .................... 179/6.4, 6.5, 6.3 R

[56] References Cited

UNITED STATES PATENTS

| | | | |
|---|---|---|---|
| 3,728,490 | 4/1973 | Nowicki | 179/6.3 R |
| 3,579,253 | 5/1971 | Dington | 179/6.3 R |
| 3,474,193 | 10/1969 | Thompson | 179/6.3 R |

*Primary Examiner*—Kathleen H. Claffy
*Assistant Examiner*—Kenneth D. Baugh
*Attorney*—Alfred A. Deluca

[57] ABSTRACT

A telephone paystation which permits normal dialling to, and reception from, a called party without deposition of a coin. When the called party answers, the paystation transmitter circuit is completely disabled by the transmission of reverse battery polarity from the central office to the telephone paystation. Normal transmission is restored, upon deposit of a coin, by turning on a controlled rectifier to complete a low impedance path from the telephone line to the voice transmitter circuit.

14 Claims, 2 Drawing Figures

POST PAY TELEPHONE PAYSTATION CIRCUIT

This application is a continuation-in-part of United States application Ser. No. 170,454 filed Aug. 10, 1971 and entitled Post Pay Telephone Paystation Circuit and now abandoned.

FIELD OF THE INVENTION

This invention relates to telephone paystations and more particularly to post pay telephone paystations where a coin is deposited after the called party has answered.

DESCRIPTION OF THE PRIOR ART

In the post pay type of telephone paystation circuit the receiver may be taken off the hook and normal dialling may be effected without first making a coin deposit. When the telephone central office completes a circuit to the person being called (the called party), the line polarity, supplied to the paystation of the calling party, from the central office battery, is reversed to render the voice transmitter inoperative until the appropriate coin deposit. The reversal of the line polarity fed to the calling party at the telephone paystation usually is effected when the called party lifts his receiver to answer the phone. It is also common practice, in addition to disabling the transmitter, to attenuate the signal received by the calling party from the called party, when the called party answers the call, until the correct coin deposit has been made.

Applicant, Joseph Thompson, has previously developed other circuit arrangements which are subject matter of Canadian Pat. Nos. 779,407 and 824,216 issued on Feb. 27, 1968 and Sept. 30, 1969 respectively.

Unlike the circuits used in the aforementioned patents of Joseph Thompson, and other known circuits, the circuit of this invention is almost completely solid state as it does not incorporate any electromagnetic relays or reed switches. Aside from the usual dial and switch hook contacts the only moving mechanical parts are those of a coin actuatable momentary contact switch which is commonly known as a coin switch.

When the line polarity reverses a circuit for a post pay telephone paystation should inhibit the transmitter while providing a low impedance holding path at the telephone paystation to hold an established call. In addition, the holding path should be arranged such that it is effectively disconnected once the appropriate coin deposit has been made in order not to impair transmission and reception at the telephone paystation by loading the telephone line. Additionally, it is highly desirable that the telephone paystation circuit be generally insensitive to voltage transients on the telephone line and of a design which will not seriously affect an established call should the circuitry yield to a voltage transient.

The circuits of the preferred embodiments of the invention permit high sensitivity and reliable operation on long paystation loops, and minimize loading of the subscriber paystation line once the coin has been deposited to restore paystation receiver and transmitter operation to normal. Furthermore, the circuits of the preferred embodiments are generally insensitive to voltage transients on the telephone line.

SUMMARY OF THE INVENTION

It has been found that a parallel combination of a controlled rectifier and a diode, poled in opposite directions, may be used in the voice transmitter circuit of a telephone paystation to achieve post pay telephone operation. With normal polarity on the telephone line, a series circuit, including the dial pulse contacts and said diode in forward bias, shunts the telephone line to allow the calling party to dial from the telephone paystation. When the central office has reversed the telephone line polarity the reverse bias developed across said diode disables the transmitter until the now forward biased controlled rectifier is turned ON by a suitable coin deposit.

In one embodiment of the invention the coin switch is provided with normally closed contacts which are used to maintain a network in shunt with the telephone line so as to hold an established call after the telephone line polarity at the telephone paystation has been reversed by a battery reversal at the central office. In addition to holding an established call, a portion of the line current passing through the shunting network is diverted to the voice receiver circuit of the paystation to provide a reduced voice signal in the voice receiver at the paystation. A controlled rectifier is used, in its non-conducting state, to inhibit the voice transmitter circuit until the required coin or coins have been deposited. Once the required coin deposit has been made to effect momentary closure of the coin switch, the controlled rectifier is turned ON to restore the transmitter and receiver circuits to normal operation. By incorporating a voltage threshold in the shunt network, the line current flowing through the shunt network, when the controlled rectifier is conducting, may be reduced to a negligibly small value or zero, as the line current through the shunt network will depend on the voltage threshold of the shunt network relative to the voltage present across the shunt network.

In another embodiment the voice receiver is unaffected by a polarity reversal at the central office as the parallel combination of the controlled rectifier and the diode are connected in series with the voice transmitter. As in said one embodiment, the controlled rectifier in this other embodiment is used in its non-conducting state, to effectively disconnect the transmitter until the required coin or coins have been deposited. This other embodiment obviates the need of a shunting network with a voltage threshold as described in said one embodiment and requires a coin switch with normally open contacts only.

A study of a telephone circuit will indicate that normal reception is possible, and an established connection to a called party can be held by a telephone paystation or regular subscriber set with the telephone transmitter microphone or button disconnected or removed.

Thus in accordance with the present invention, the telephone paystation circuit comprises a voice transmitter circuit and a voice receiver circuit arranged for connection to a telephone line with a diode in series with the voice transmitter circuit so as to pass line current only when normal battery polarity is applied to the telephone line. A controlled rectifier is connected in parallel with the diode, with the anode and cathode of the controlled rectifier being connected to the cathode and anode respectively of the diode, so as to pass current only in the direction resulting from reverse line polarity. A coin actuatable switch having normally open contacts is arranged to control the gate of the controlled rectifier so as to turn ON the controlled rectifier, on deposit of a coin when the controlled rectifier is forward biased by reverse line polarity. As a result of applicants' invention, the application of reverse polarity to the telephone line renders the voice transmitter circuit inoperative, due to the presence of the diode, until the controlled rectifier is turned ON by a suitable coin deposit so as to shunt the diode and allow normal transmission from the telephone paystation.

BRIEF DESCRIPTION OF THE DRAWINGS

Example embodiments of the invention will now be described with reference to the accompanying drawings in which:

Referring to FIG. 1, telephone line conductors L1 and L2 lead from a telephone central office (not shown) to a telephone paystation 12. The potential of L2 being positive with respect to the potential of L1 during operation with normal polarity. During operation with reverse polarity, the potential of L2 and L1 reverse from their normal polarity such that L1 is positive with respect to L2.

Normally open switch hook contacts 10 and normally closed dial pulse contacts 11 in series with line conductor L1 render the telephone paystation 12 inoperative until the switch hook contacts 10 are closed by removing the telephone receiver off the receiver cradle or hook switch (the telephone receiver and the telephone cradle are not shown).

Figure 1:
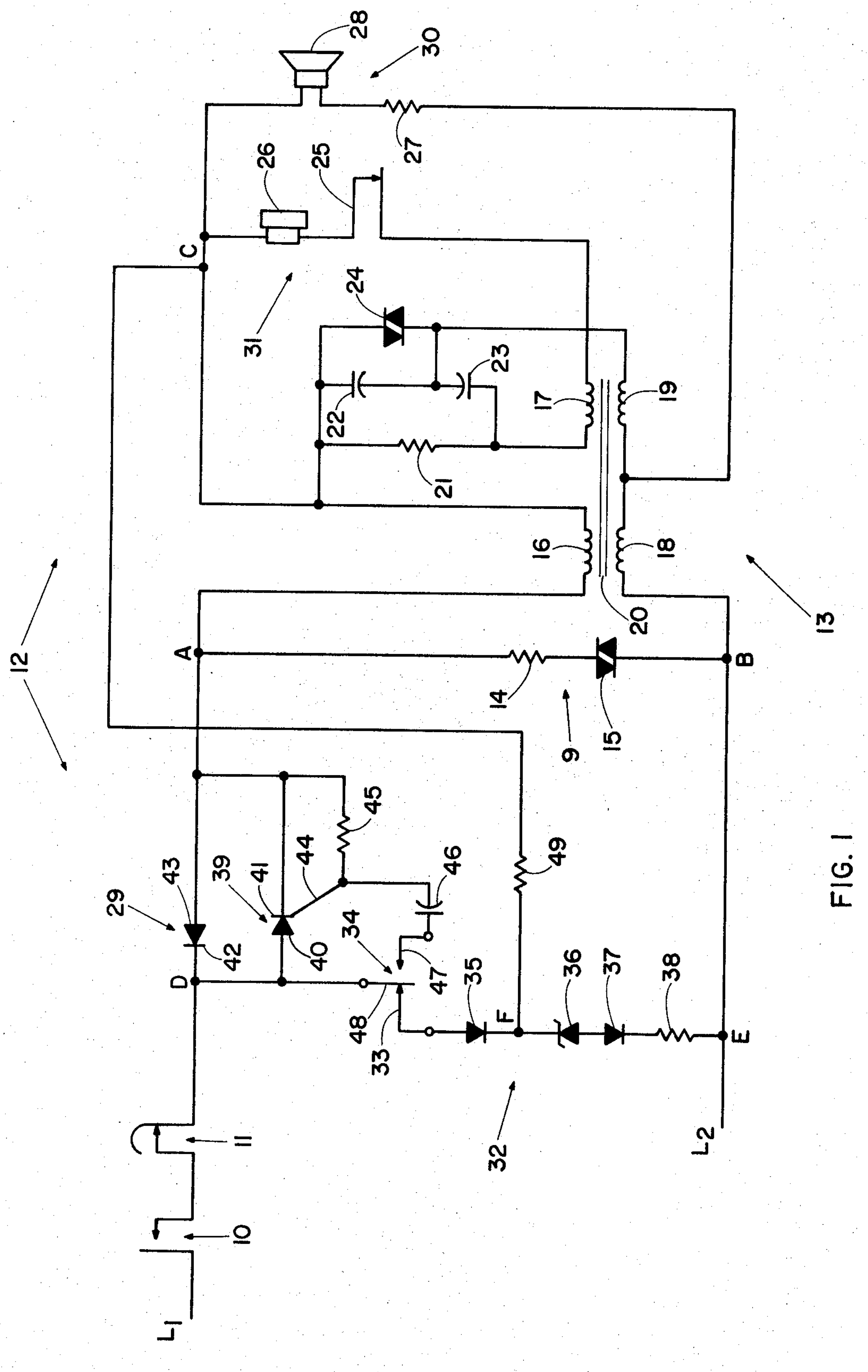
FIG. 1 is a schematic diagram of a post pay telephone paystation circuit in accordance with one embodiment of the present invention.

A network 13 which is outlined in FIG. 1 to the right of points A, B, forms part of the telephone paystation circuitry 12. This network circuitry 13 is conventional and well known and for this reason will only be described briefly.

A resistor 14 in series with a varistor 15 forms a power stabilizing circuit 9 which is connected in shunt with the line at points A, B in the well known manner. Four coils 16, 17, 18 and 19 are transformer windings on a common core 20 arranged to achieve side tone balancing in the conventional manner in conjunction with a resistor 21, two capacitors 22, 23 and a varistor 24.

Normally closed dial off normal contacts 25 which are in series with a voice receiver 26 prevent dial pulses from being heard in the voice receiver 26 during the dialling operation, while a resistor 27 in series with a voice transmitter 28 limits the current through the voice transmitter 28.

When normal polarity exists on the telephone line (which L2 is positive with respect to L1) a transmitter circuit 30 exits along L2 to point B through coil 18, resistor 27, transmitter 28 to a point C of network 13, thence through winding 16 to point A and back along line L1 through a first diode 29, dial pulse contacts 11 and switch hook contacts 10. In addition to the transmitter circuit 30 an alternate circuit exits from B to A through varistor 15 and resistor 14 of the power stabilizing circuit 9.

A receiver circuit 31 which is arranged in the conventional manner is fully operative with normal line polarity. The receiver circuit includes windings 17, 19; capacitors 22, 23; resistor 21; varistor 24 and dial off normal contacts 25.

A shunt network 32 forms part of the novel circuitry of FIG. 1 which embodies the present invention, the shunt network 32 comprises a normally closed contact 33 of a coin actuatable momentary transfer switch 34 (hereinafter to be known as a coin switch), a second diode 35, a zener diode 36, a third diode 37, and a resistor 38 arranged in series. The shunt network 32 is placed in shunt with telephone line conductors L1 and L2 at points D and E, with the second 35 and third 37 diodes poled to carry current when point D is positive with respect to point E. The zener diode 36 is poled in a direction opposite to that of the second 35 and third 37 diodes so as to provide a voltage threshold to oppose current flow through the shunt network 32. The potential drop across points E and F when current flow through the shunt network is determined by the zener diode 36 in combination with resistor 38.

The threshold value of zener diode 36 is chosen such that negligible current will flow through the shunt network 32 when reverse line polarity is present at direct current line conductors L1 and L2 (L1 positive with respect to L2), if a coin has actuated the coin switch 34. That is, the potential across terminals D, E once a coin has been deposited should be less than the threshold voltage of the zener diode 36 due to the loading of the line conductors L1 and L2 by the telephone network 13.

A controlled rectifier 39 is connected in parallel with the first diode 29 such that the anode 40 and the cathode 41 of the controlled rectifier 39 are connected to the cathode 42, and the anode 43 of the diode 29 respectively. The gate 44 of the controlled rectifier 39 is connected through a gate resistor 45 to the anode 41 of the controlled rectifier 39, and through a gate capacitor 46 to normally open contacts 47 of the coin switch 34. A transfer contact 48 of the coin switch 34 is connected to point D which is common to the cathode 42 and the anode 40 of the first diode 29 and the controlled rectifier 39 respectively.

The junction F of the cathode of the zener diode 36 and the cathode of the second diode 35 is connected through an attenuating resistor 49 to point C of network 13.

In normal operation of the paystation 12 illustrated schematically in FIG. 1 telephone line conductor L2 is positive with respect to L1. When the receiver (not shown) is taken off its hook cradle (also not shown), the switch hook 10 closes such that line current from the central office (not shown) flows through winding 18, resistor 27, transmitter 28, winding 16, first diode 29, and the dial pulse 11 and switch hook contacts 10 to telephone line conductor L1. With normal polarity on the telephone lines L1 and L2, the receiver 26 indicates the presence of dial tone, busy tone or the like.

As the dial (not shown) is operated, the dial pulse contacts 11 interrupt the flow of current along telephone lines L1 and L2 and thereby transmit the necessary information to the central office to reach the called party. When the central office senses that the called party has answered, the polarity sent to the paystation 12 is reversed such that telephone line L1 becomes positive with respect to telephone line L2 and the first diode 29 no longer conducts. The only means of holding the established connection at the telephone paystation 12 is through the shunt network 32 which carries sufficient holding current from point D on L1 to point E on L2. The potential appearing across points D, E drops from the central office battery potential through the resistance of the telephone lines L1 and L2 to a value determined by the resistor 38 and the voltage of the zener diode 36.

A portion of the current flowing through the shunt network 32 is diverted at point F along resistor 49 to point C of the network 13. Following this flow of current to point C the said current continues through the transmitter 28, the resistor 27, the coil or winding 18 to points B, E and thence back to the central office via telephone line L2. The reduced potential across points F, E in combination with resistor 49, reduces the current through the transmitter 28 such that the transmitter 28 is rendered inoperative until a suitable coin deposit has been effected.

The receiver circuit 31 is also affected by the shunt network 32 as the signal from the calling party is attenuated by the shunt network 32 and the attenuator network comprising resistor 49. The signal from the called party is further attenuated by coupling to the receiver circuit, which lies across coil 17, through coil 18 and not through coils 18 and 16 as in normal telephone operation.

When the coin switch 34 is actuated the normally closed contacts 33 are momentarily separated by the transfer of the transfer contact 48 to the normally open contact 47 of the coin switch.

As the normally closed contacts 33 separate, the voltage across points D, E rises to the central office battery potential. When the gate 44 is connected to the anode 40 through gate capacitor 46 and normally open contacts 47 of the coin switch 34, the controlled rectifier 39 is turned ON so as to complete a path for the reversed line polarity from telephone line L1 through the network 13 and back to telephone line L2. Once the controlled rectifier 39 has turned ON, the potential across points D, E drops below the threshold voltage of zener diode 36 due to the loading of the telephone line by the network 13, so as to effectively remove the shunt path from the telephone line. The establishment of a low impedance path through the controlled rectifier 39 and the effective removal of the shunt path caused by the shunt network 32 ensures that the telephone paystation 12 will transmit and receive information in the normal manner once the coin switch 34 has been actuated to turn ON the controlled rectifier 39.

Figure 2:
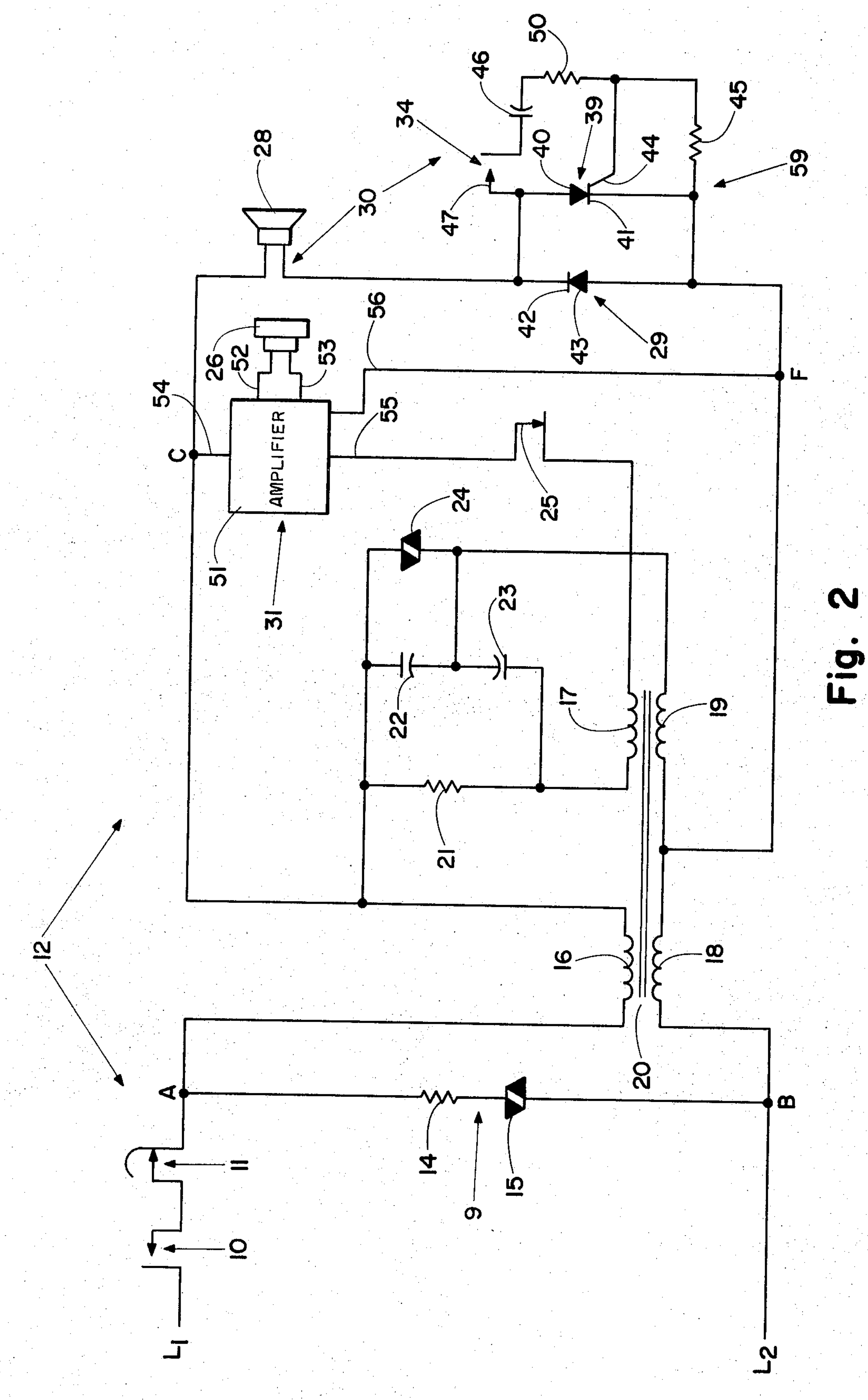
FIG. 2 is a schematic diagram of another embodiment of the present invention.

An alternate embodiment which permits a normal listening level, while preventing transmission until a suitable coin has been made, is illustrated in FIG. 2.

With reference to FIG. 2 it can be seen that its schematic arrangement is similar to the schematic arrangement of FIG. 1. Because of this similarity only the structural differences are denoted in the following circuit description and all elements common to FIGS. 1 and 2 are given the same reference numerals for convenient cross-reference.

In FIG. 2, the parallel combination of the controlled rectifier 39 and the first diode 29 which form part of the transmit inhibit circuit 59 is placed in the transmitter circuit 30 in series with transmitter 28. The placement of the transmit inhibit circuit 59 in series with the transmitter 28 as shown in FIG. 2 allows normal receiver operation at all times and obviates the need for shunt network 32 and resistor 49 as shown in FIG. 1. As it is possible, even with the transmitter disabled, to transmit a faint signal from the telephone paystation by shouting into the receiver 26, a receiver amplifier 51 is placed in the receiver circuit 31. While this receiver amplifier 51 is not absolutely necessary its presence provides an additional safeguard against misuse of the telephone paystation.

In FIG. 2, point A is connected directly to the dial pulse contacts 11. The shunt network 32 joining points D and E and the connection from the shunt network 32 to point C via resistor 49 as illustrated in FIG. 1 are totally absent. Aside from the introduction of receiver amplifier 51 to the receiver circuit 31 and the placement of the transmit inhibit circuit 59 in series with the transmitter 28, the telephone paystation circuit of FIG. 2 is substantially the same as found in a conventional subscriber telephone set equipped with a rotary dial.

As illustrated in FIG. 2 the transmit inhibit circuit 59 comprises a controlled rectifier 39 connected in parallel with a diode 29 such that the anode 40 and the cathode 41 of the controlled rectifier 39 are connected to the cathode 42 and the anode 43 of the diode 29 respectively. The gate 44 of the controlled rectifier 39 is connected through a gate resistor 45 to the cathode 41 of the controlled rectifier 39. Normally open contacts 47 of a coin switch 34 connects the anode 40 and the gate 44 of the controlled rectifier 39 via a serially connected gate capacitor 46 and resistor 50. Although the coin switch 34 illustrated in FIG. 2 does not require a normally closed contact 33 as does the coin switch 34 of FIG. 1, for simplicity, the same numerical designations have been used for all similar elements wherever possible in both FIGS. 1 and 2.

The receiver amplifier 51 is inserted between the receiver 26 and its normal connections to point C and the normally closed dial-off-normal contacts 25. The receiver 26 is connected to output terminals 52 and 53 of receiver amplifier 51. Signals enter the receiver amplifier 51 via receiver input terminals 54 and 55 which are connected to point C and the dial off-normal contacts 25 respectively.

The receiver amplifier 51, which is of conventional design, is usually designed for unity gain and its primary function is to prevent transmission from the telephone paystation 12 by shouting into the receiver 26. Said amplifier 51 is powered from the telephone lines L1, L2 via terminals 54 and 56 which are connected to points C and F respectively. A polarity guard circuit (not shown) forms part of the receiver amplifier 51 to supply the amplifier circuit with operating voltage of the correct polarity independent of the polarity sent to the telephone paystation 12 from the central office.

In normal operation of the paystation 12 telephone line conductor L2 is positive with respect to L1. When the receiver (not shown) is taken off its hook cradle (also not shown) the switch hook 10 closes such that line current from the central office (not shown) flows through winding 18, diode 29, transmitter 28, winding 16, dial pulse contacts 11 and switch hook contacts 10 to telephone line conductor L1.

When the central office senses that the called party has answered, the polarity sent to the paystation 12 is reversed such that telephone line conductor L1 becomes positive with respect to telephone line conductor L2 and diode 29 no longer conducts. As a result of this polarity reversal transmitter 28 is effectively disconnected. Power stabilizing circuit 9 which shunts the telephone line at points A and B, allows sufficient holding current to flow along the telephone line conductors L1 and L2 to hold the established call once the line polarity has been reversed.

Signals returning from the called party flow in the well known manner from telephone line conductors L1 and L2 through the coils 16, 17, 18 and 19 of the well known hybrid network, to the receiver amplifier 51 and thence to the receiver 26.

When the normally open contacts 47 of the coin switch 34 are actuated by a suitable coin deposit the controlled rectifier 39 is turned ON by connecting gate capacitor 46 across the gate-anode junction of the controlled rectifier 39 through resistor 50. Once the controlled rectifier 39 is turned ON the transmitter 28 of the telephone paystation 12 is effectively reconnected to telephone line conductors L1 and L2 and normal transmission is allowed in spite of the reversed line polarity.

The embodiments illustrated in FIGS. 1 and 2 differ primarily in the placement of the inhibit circuit 59. It is understood that other placements of the inhibit circuit 59 may be made to disable the transmitter 28 without departing from the spirit of the invention.

What is claimed is:

1. A postpay telephone paystation circuit of the direct current reversing type, comprising:

a. a voice transmitter circuit and a voice receiver circuit arranged for connection to a telephone line;

b. a first diode in series with the voice transmitter circuit, said diode being poled to pass line current only in the direction resulting from normal line polarity;

c. a controlled rectifier connected in parallel with said diode, the anode and the cathode of the controlled rectifier being connected to the cathode and anode of the diode respectively so as to pass current only in the direction resulting from reverse line polarity;

d. a coin actuatable momentary transfer switch having normally closed and normally open contacts, the normally open contacts of said switch being arranged to control the gate of the controlled rectifier so as to fire the controlled rectifier upon deposit of a coin when the controlled rectifier is biased in the forward direction by the reverse line polarity;

e. a shunt network having a selected voltage threshold and adapted to carry current only when the line polarity is reversed, the shunt network being in series with the normally closed contacts of said switch, said network and the normally closed contacts of said switch being in shunt with the telephone line;

whereby with reversed line polarity, on the telephone line the voice transmitter circuit is rendered inoperative by the first diode until the controlled rectifier is fired by the deposition of a coin to shunt said diode and thereby permit normal transmission and reception by the telephone paystation.

2. The invention as claimed in claim 1 further comprising an attenuation network connecting the shunt network to the voice receiver circuit to permit a signal on the telephone line to be received by the voice receiver circuit before deposit of a coin, when the telephone line polarity is reversed and the normally closed contacts are closed.

3. The invention as claimed in claim 1 wherein the controlled rectifier is fired by connecting a capacitor between the gate and the anode of the controlled rectifier through the normally open contacts of the coin actuatable momentary transfer switch.

4. The invention as claimed in claim 2 wherein the controlled rectifier is fired by connecting a capacitor between the gate and the anode of the controlled rectifier through the normally open contacts of the coin actuatable momentary transfer switch.

5. The invention as claimed in claim 1 wherein the shunt network includes second and third diodes poled to carry current resulting from reverse line polarity, and a threshold diode poled to provide a voltage threshold against said reverse line polarity, the threshold diode being in series with, and between, the second and third diodes.

6. The invention as claimed in claim 2 wherein the shunt network includes second and third diodes poled to carry current resulting from reverse line polarity, and a threshold diode poled to provide a voltage threshold against said reverse line polarity, the threshold diode being in series with, and between, the second and third diodes.

7. The invention as claimed in claim 2 wherein the attenuation network includes an attenuating resistor connecting the cathode of the threshold diode to the voice receiver circuit.

8. The invention as claimed in claim 1 wherein the shunt network includes second and third diodes poled to carry current resulting from reverse line polarity and a threshold diode poled to provide a voltage threshold against said reverse line polarity, the threshold diode being in series with, and between, the second and third diodes, and wherein the voltage threshold diode is greater than the voltage across the telephone line at the telephone paystation when the controlled rectifier is conducting.

9. The invention as claimed in claim 2 wherein the shunt network includes second and third diodes poled to carry current resulting from reverse line polarity and a threshold diode poled to provide a voltage threshold against said reverse line polarity, the threshold diode being in series with, and between, the second and third diodes, and wherein the voltage threshold of the threshold diode is greater than the voltage across the telephone line at the telephone paystation when the controlled rectifier is conducting.

10. The invention as claimed in claim 2 wherein the controlled rectifier is fired by connecting a capacitor between the gate and the cathode of the controlled rectifier through the normally open contacts of the said transfer switch, wherein the shunt network includes second and third diodes poled to carry current resulting from reverse line polarity and a threshold diode poled to provide a voltage threshold against said reverse polarity, the threshold diode being in series with, and between, the second and third diodes and having a voltage threshold greater than the voltage across the telephone line at the telephone paystation when the controlled rectifier is conducting and wherein the attenuation network includes an attenuating resistor connecting the cathode of the threshold diode to the voice receiver circuit.

11. A postpay telephone paystation circuit of the direct current reversing type, comprising:

a. a voice transmitter circuit and a voice receiver circuit arranged for connection to a telephone line;

b. a diode in series with the voice transmitter circuit, said diode being poled to pass current only in the direction resulting from normal line polarity, c. a controlled rectifier connected in parallel with said diode, the anode and the cathode of the controlled rectifier being connected to the cathode and anode of the diode respectively so as to pass current only in the direction resulting from reverse line polarity;

d. a coin actuatable momentary contact switch having normally open contacts, said contacts of said switch being arranged to control the gate of the controlled rectifier so as to fire the controlled rectifier upon deposit of a coin when the controlled rectifier is biased in the forward direction by the reverse line polarity;

whereby with reversed line polarity, on the telephone line the voice transmitter circuit is rendered inoperative by the diode until the controlled rectifier is fired by deposition of a coin to shunt said diode and thereby permit normal transmission by the telephone paystation.

12. The invention as claimed in claim 11 wherein the controlled rectifier is fired by connecting a capacitor between the gate and the anode of the controlled rectifier through the normally open contacts of the coin actuatable momentary contact switch.

13. The invention as claimed in claim 11 wherein the voice transmitter circuit includes a transmitter and wherein the controlled rectifier is connected in series with said transmitter.

14. The invention as defined in claim 12 wherein the voice receiver circuit includes a receiver amplifier and a receiver and wherein the output of said amplifier is connected to the receiver.

* * * * *